(12) United States Patent
Paul et al.

(10) Patent No.: US 11,055,969 B2
(45) Date of Patent: Jul. 6, 2021

(54) CARD MACHINE WITH A SECURITY USER INTERFACE

(71) Applicant: Wanzl GmbH & Co. KGaA, Leipheim (DE)

(72) Inventors: Juergen Paul, Loppenhausen (DE); Thomas Gasche, Leipheim (DE); Thomas Lutzenberger, Loppenhausen (DE)

(73) Assignee: WANZL GMBH & CO. KGAA, Leipheim (DE)

( * ) Notice: Subject to any disclaimer, the term of this patent is extended or adjusted under 35 U.S.C. 154(b) by 0 days.

(21) Appl. No.: 16/474,536

(22) PCT Filed: Jan. 11, 2018

(86) PCT No.: PCT/EP2018/050658
§ 371 (c)(1),
(2) Date: Jun. 27, 2019

(87) PCT Pub. No.: WO2018/137933
PCT Pub. Date: Aug. 2, 2018

(65) Prior Publication Data
US 2020/0027318 A1     Jan. 23, 2020

(30) Foreign Application Priority Data
Jan. 30, 2017    (DE) ..................... 10 2017 101 732.1

(51) Int. Cl.
*G07F 17/00*    (2006.01)
*G07F 17/42*    (2006.01)
(Continued)

(52) U.S. Cl.
CPC .............. *G07F 17/42* (2013.01); *G06F 3/045* (2013.01); *G07B 1/00* (2013.01); *G07B 15/04* (2013.01);
(Continued)

(58) Field of Classification Search
CPC ........ G07F 17/42; G07F 7/0866; G06F 3/045; G07B 1/00; G07B 15/04; G07C 9/00912
(Continued)

(56) References Cited

U.S. PATENT DOCUMENTS

2004/0226993 A1    11/2004  Fulcher et al.
2006/0046842 A1*   3/2006   Mattice .................. G07F 17/32
                                                    463/29
(Continued)

FOREIGN PATENT DOCUMENTS

DE    102010001570 A1    8/2011
EP         0935219 A1    8/1999
(Continued)

OTHER PUBLICATIONS

"Power.Cash Power.Cash 'Touch'," Skidata Website, Available Online at https://members.skidata.com/index.php?eID=getContainer&apikey=d2b5e4b962a29d332a56161034e81247&file=297, Available as Early as Jun. 5, 2016, 2 pages.
(Continued)

*Primary Examiner* — Daniel A Hess
(74) *Attorney, Agent, or Firm* — McCoy Russell LLP

(57) ABSTRACT

The invention relates to a card vending machine and a method for operating the same. The vending machine dispenses cards that contain electronically stored data, which are read in and processed by downstream systems, such as access control systems, vending systems, parking systems, and other systems. The vending machine is tamper-resistant and is equipped with a continuous glass panel, areas of which serve as a graphic user interface. The vending machine communicates with a central server.

20 Claims, 10 Drawing Sheets

(51) Int. Cl.
  *G06F 3/045* (2006.01)
  *G07B 1/00* (2006.01)
  *G07B 15/04* (2006.01)
  *G07C 9/00* (2020.01)
  *G07F 7/08* (2006.01)

(52) U.S. Cl.
  CPC ....... *G07C 9/00912* (2013.01); *G07F 7/0866* (2013.01); *B32B 2457/208* (2013.01)

(58) Field of Classification Search
  USPC ........................................................ 235/381
  See application file for complete search history.

(56) References Cited

U.S. PATENT DOCUMENTS

| 2010/0066491 | A1 | 3/2010 | Bohen et al. |
| 2011/0032205 | A1 | 2/2011 | David |
| 2016/0343204 | A1 | 11/2016 | Maher et al. |
| 2020/0334946 | A1* | 10/2020 | Eatman ............... G07F 17/3276 |

FOREIGN PATENT DOCUMENTS

| GB | 2348039 A | 9/2000 |
| WO | 2004055748 A1 | 7/2004 |

OTHER PUBLICATIONS

ISA European Patent Office, International Search Report Issued in Application No. PCT/EP2018/050658, dated Apr. 4, 2018, WIPO, 6 pages.

\* cited by examiner

CARD MACHINE WITH A SECURITY USER INTERFACE

CROSS-REFERENCE TO RELATED APPLICATIONS

The present application is a U.S. National Phase of International Patent Application Serial No. PCT/EP2018/050658 entitled "CARD MACHINE WITH A SECURITY USER INTERFACE," filed on Jan. 11, 2018. International Patent Application Serial No. PCT/EP2018/050658 claims priority to German Patent Application No. 10 2017 101 732.1 filed on Jan. 30, 2017. The entire contents of each of the above-referenced applications are hereby incorporated by reference for all purposes.

TECHNICAL FIELD

The invention is in the field of vending machine technology, electronic systems, and network technology, and relates in particular to a vending machine that can be used, for example, with access systems, automatic teller machine systems, and ticket vending machine systems.

BACKGROUND AND SUMMARY

Vending machines of this type comprise a user interface that allows the machine to capture instructions from the user, data, or money for further processing. The latter can be accomplished by inputting coins, banknotes, credit cards, or other cards, for example. Digital data, e.g. PIN data for card use, or other data, such as authentication data, can likewise be captured.

In the vending machine, the collected money or data are then fed to an automatic and electronic processing system, which triggers an action depending upon the application of the machine, e.g. it grants direct access or issues an authorization for indirect access (e.g. in the form of a card or a voucher). In the case of overpayment, change can also be dispensed.

These vending machines comprise a multitude of components that are necessary for providing the required functionality, along with a user interface designed to interact with the user. The components are integrated into a vending machine body, which serves as a kind of housing. Depending upon the field of application and use, the vending machine further comprises various electronic components, such as a banknote acceptor with a counting function, an RFID reader for reading out data that are stored on an RFID card, and/or a printer for printing cards or paper vouchers.

For instance, EP 0935219 B1 describes one example of a vending machine designed as a ticket vending machine for parking lots, which issues and receives returned parking authorization cards. For this purpose, parking-related data (such as parking time, parking fee) are written by the vending machine onto the authorization card. A cost exemption option can also be provided.

In addition to the above-described use for parking lot ticket vending machines, other uses for vending machines may involve access control, bank transfers, or the dispensing of tickets, or other applications.

Until now, such vending machines have been designed, fitted and assembled for their intended purpose, and then delivered to the customer. After delivery, it has heretofore not been possible to modify the functionality and the security requirements of the vending machine without extensive retrofitting measures. It would be desirable for the vending machine to be alterable in terms of its functionality after delivery as well, and even during operation, thus allowing it to be adapted flexibly to current requirements.

Another important aspect relates to the security of the vending machine. During operation, the vending machine typically contains a certain amount of cash. It is therefore tremendously important to protect and secure these vending machines against unauthorized access and unauthorized vending machine openings.

In the prior art, DE 10 2010 001570 A1 discloses a vending machine which has a camera for recording images of the user operating the machine. The images captured by the camera are then compared with reference images stored in a database to identify matches, perform an authorization of the user and, if necessary, activate or deactivate other functions of the vending machine.

Proceeding from the known prior art, the object of the present invention is to provide a vending machine which is tamper-resistant and to provide a method for operating a vending machine and a vending machine system, which is secure in terms of the storage of sensitive data (e.g. personal data of the user) and is flexible in terms of production, and which can thus be manufactured and operated more cost-effectively.

This object is attained by the respective subjects of the appended independent claims, in particular by a vending machine, a door element for a vending machine, a method for operating a vending machine, and a vending machine system. Advantageous embodiments are the subject of the dependent claims, the description, and the drawings.

According to a first aspect of the invention, the object is attained by a vending machine, in particular a card vending machine, comprising:
  a door element and
  a body, wherein the body is sealed by the door element when the vending machine is in operation, keeping the vending machine in a secured closed state.

A plurality of integrated operating modules are formed in the door element, wherein the operating modules comprise
  multiple screen elements for inputting and outputting data, for example in the form of a (graphic) user interface, and
  multiple insertion and dispensing units for the insertion and dispensing of value units in the form of physical objects, for example for the insertion and dispensing of money, coins, cards, and chips, and wherein at least one insertion and dispensing unit is designed as a card dispensing unit.

An entire front panel of the door element is formed as a continuous glass panel, into which the operating modules are integrated flush with the (top) surface and without gaps during operation of the vending machine (i.e. after assembly and delivery of the vending machine), the screen elements being formed as a touch-sensitive screen or touchscreen. For the screen elements, a capacitive sensor technology is preferably used. One example of a touchscreen with sensor technology is described in greater detail in GB 2348039 B. With capacitive screens, an additional piezo element layer with piezo elements can be used to detect tactile feedback.

In a preferred embodiment of the invention, a capacitive touchscreen technology with multi-sensor functionality is used for the screen elements formed as a touchscreen, in which simultaneous touches can also be detected. Typically, the touchscreen comprises a touchscreen sensor as the actual input and output unit, a controller that can be arranged in or on the touchscreen sensor, and optionally a driver that can be arranged in the operating module. In an alternative and likewise preferred embodiment of the invention, the touchscreen sensor can be embodied as a projected capacitive sensor (usually called "PCT"="Projected Capacitive Touch" or "PCAP"). In that case, the sensor uses two planes with a conductive pattern (such as stripes or diamonds). The planes are isolated from one another. When a finger is located at the crossing point of two strips, the capacitance of the capacitor will change, and a greater signal will arrive at the receiver strip. Thus, this signal change can be measured accurately on the basis of the X and Y coordinates, and multiple touch points can be precisely defined. The flow of current from the corners of the touchscreen to the touch point is proportional to the XY coordinates. The key advantage of this system is that the sensor can be mounted on the back of the cover glass, since touch recognition is "projected" through the glass. Thus, operations are performed on the practically wear-free glass surface. Moreover, the recognition of gestures and multiple touches (i.e. multi-touch) is possible. In other embodiments of the invention, however, resistive or inductive or other sensor technologies for touchscreens may also be used. Basically, the touchscreen sensor is a user interface (also called a monitor or display) and comprises the sensor for detecting the input signals for controlling and operating the vending machine, along with a display on which interactive surfaces, switch elements, control fields and/or input fields for controlling the vending machine can be displayed.

During operation of the vending machine, i.e. once it has been assembled and delivered, the glass panel and the operating modules integrated therein form an integral component. More particularly, the operating modules are embedded in the glass panel, flush with its surface. The operating modules and the front panel of the vending machine form a continuous (user) interface. The security of the vending machine can thereby be significantly increased.

During manufacturing of the vending machine, the operating modules can be inserted into the glass panel, more particularly into prefabricated punched-out sections of the glass panel, and sealed/grouted. A rubber-like or silicone-like material can be used for this purpose. In an advantageous refinement of the invention, the operating modules can thus be exchanged flexibly during production. For example, a banknote reader can be replaced by a card reader, and vice versa. To further simplify the assembly process, the operating modules may be consistent in terms of size. Otherwise, the size of the operating modules is adapted to the respective cutouts provided in the glass panel. In the assembled state, however, i.e. during the time phase after completion of assembly and e.g. after delivery of the vending machine, the operating modules cannot be exchanged or removed without tools. In particular, the operating modules are installed to form a continuous, monolithic unit and integrated into the glass panel.

The operating modules are preferably structured in accordance with a tile arrangement. The operating modules are designed for use in and for integrative connection to the glass panel. The functionality of each tile or of each integrated operating module is encoded in an electronic circuit. In a preferred embodiment of the invention, a display element that extends over nearly the entire width of the glass panel is formed as the top element. Beneath it are two or three rows of tile elements. The first row of tile elements can implement various payment modalities, such as a coin acceptance operating module, a banknote input operating module, and a card input operating module. The second row, below the first, may contain operating modules for dispensing cards (e.g. in combination with a card printer). The arrangement of the tiles and the arrangement of the operating modules can be flexibly designed for the particular application.

In the assembled state, the front panel of the door element comprises a plurality of different operating modules, some of which are formed as screen elements. All of the operating modules are integrated into the glass panel such that they form a continuous surface. There are no protrusions protruding from the plane of the front panel. This has the important advantage that the front panel of the vending machine can be easily cleaned and is less readily soiled. Furthermore, due to the tile-like structure, orientation for operation of the machine is easy. The operating modules are permanently installed and integrated into the glass panel. For this purpose, the connection between operating module and glass panel is grouted or sealed. This has the important technical advantage that the front panel of the vending machine having the glass panel is completely impervious to splashed or dirty water.

The vending machine may be designed to print onto the card. In that case, a data carrier (paper, plastic) can be imprinted with data. The data may be analog data (image, characters, etc.) or digital data (e.g., as a code for a chip or transponder card). The data are stored exclusively on the server. No association between session data (data input by the user or collected automatically during operation of the machine) and the user's personal data is stored in the vending machine or on the card. Thus, in the event of tampering, even a corrupted process cannot read data from either the card or the vending machine that might enable an association with the user's personal data (e.g., such questions as: "When has which user fed what amount of money into the machine?"). Such associative relationships can be created only on the server by means of additional, preconfigured security measures.

The vending machine may be designed to output information. The information can be provided as a digital data set.

In principle, the vending machine is designed for dispensing cards or value units (money, prepaid cards, etc.) or information, e.g. in the form of a (digital) data set, and not for dispensing goods and products. The dispensing of goods can be controlled and implemented via downstream systems. However, the vending machine may be used to dispense an authorization, e.g. in the form of a card, for a product dispensing system.

In one advantageous embodiment of the invention, the vending machine comprises a lighting unit, which may have a plurality of lighting segments, wherein one of the lighting segments is arranged, in particular, on the front panel of the door element and extends along an outer edge of the door element, and is used to illuminate the entire vending machine. This entire lighting module can be switched on and off and controlled via an electronic circuit. Thus, the lighting module can be activated, e.g. depending upon a specific operating state of the vending machine. For this purpose, a detector may be provided, in particular, which detects the presence of a user in front of the vending machine and activates the entire lighting module only in the presence of a user in the operating position. In addition, a plurality of individual tile lighting elements can be provided for illuminating the individual operating modules or the individual tiles of the glass panel. The tile lighting elements preferably are not formed in the individual operating modules, but directly on the glass panel in an area around the respective cutouts for insertion of the operating modules. The tile lighting elements can likewise be switched on and off and controlled via an electronic circuit. For example, the system may be configured, e.g. such that only the next tile to be used in the operating procedure and/or the tile currently being used is illuminated. This makes it possible to guide the user through the vending machine control menu and to indicate to the user which operating modules are to be used, and also to mark these modules visually by a corresponding signal output. The electronic circuit can still be reconfigured and modified during operation. The intensity, the mode (e.g., flashing), and/or the color of the lighting segments on the front of the door element or along the outer edge of the door element are freely selectable or configurable. The flexible color selection can be used to indicate different states (e.g., flashing red in the case of malfunction). These lighting segments may be embodied as extending around the entire periphery and/or as intermittent.

In a further advantageous embodiment of the invention, the vending machine comprises a server interface to an external server, wherein a database can be connected to the server. If multiple vending machines are operated in one system, they can thus be controlled uniformly by a corresponding programming of the server.

In a further advantageous embodiment of the invention, at least one operating module of the vending machine is designed as an RFID printer for printing the card to be dispensed. The card can be printed as a paper card or a plastic card. The card can be printed with data, for example in the form of a QR code or a barcode, or as a chip card, e.g. as an RFID card. Alternatively or cumulatively, for printing the card with digital data, a magnetic strip card or an image card can also be dispensed, for example as a customer card bearing an image of the particular user.

In a further advantageous embodiment of the invention, the door element, more particularly at least one metal frame element of the door element, has approximately the same structural height as the body of the vending machine. The glass plate (glass panel) can be mounted on a metal frame element. In one embodiment of the invention, the glass plate extends over the entire height of the vending machine and thus corresponds to the height of the body. In an alternative embodiment of the invention, the height of the glass plate is slightly (5-15%) lower than that of the body and ends about 10-25 cm above the ground. In this lower range of 10-25 cm, a metal plate is provided to prevent damage caused by collisions with moving parts and to enable the body to be sealed off completely by the door element. In both embodiments (the glass plate has the full height or the partial height of the body) the door element seals the body off completely.

The glass of the glass panel is preferably single-pane safety glass. The glass panel can be treated with stealth effect printing. Stealth effect printing is a rear printing process with which special effects can be achieved specifically for touchscreens. Stealth effect printing is used to display black borders or touchpoints at defined locations. The printing is preferably in black. When the display is shut off, the entire surface appears black. When the display is switched on, the printed areas appear as borders, hidden areas, or fixed menu items. Thus, edges on the glass panel, for example around selected operating modules, can be highlighted without a light source (e.g., LED) lighting up.

In a further advantageous embodiment of the invention, the vending machine comprises a locking system for opening and locking the body. The locking system is preferably an electronic locking system. It can be operated using an electronic key, e.g. on a mobile data carrier, such as an RFID card or a code on the mobile phone display, or via a PIN number entered in the keypad or on the display. The locking system of the vending machine operates a mechanical locking and unlocking mechanism, which is located behind the glass panel in the body and locks or opens the body with the door element. Advantageously, the position of the mechanical locking and unlocking mechanism is not visible from the outside. In particular, no lock or comparable component is located on the front side of the door element. The entire locking and unlocking mechanism is located completely behind the door element, i.e. on the inner side of the door element and in the interior of the vending machine. This has important security advantages, since damage to the mechanical locking and unlocking mechanism is made difficult by its unknown position.

In one advantageous refinement, in addition to being activated by the electronic locking system, the locking and unlocking mechanism can be activated by a mechanical emergency activation system. The mechanical emergency activation system may be designed as a cable/spindle system which activates a spindle, which is in engagement with the mechanical locking and unlocking mechanism, via a borehole at a predefined position in the body.

The door element is mounted on the body so as to pivot about a vertical axis. The vertical pivot axis for the door element may be located on the right or left side of the vending machine. During operation, the door element closes and locks the body of the vending machine in a secured manner. The term "secured" includes two aspects: First, the locking and unlocking mechanism is not positioned on the front panel of the door element or on any other external element of the vending machine, nor is it visible from the outside. Second, it can only be unlocked using an electronic security system. The settings of the electronic security system are configurable. Thus, in a simple embodiment of the invention, unlocking can be effected only by detecting an electronic code. In more complex embodiments, additional security measures may be necessary, such as collecting user data and comparing these with reference data on the server. The door element can be pivoted, in particular, to an angle up to approximately 90° in an open state if the electronic locking system has been opened. Since, according to a preferred embodiment of the invention, the door element has approximately the same structural height as the body of the vending machine, there is the technical advantage that when the door is opened, the entire interior of the body or of the vending machine, i.e. the interior of the vending machine over its entire height and width, is accessible, which is particularly advantageous for maintenance and service work. These can then be carried out more quickly and easily, as the components are more easily accessible.

In a further advantageous embodiment of the invention, a spring element is arranged in the body of the vending machine and, during a locking process, i.e. as the door element is pivoting from an open to a closed state, exerts a force counteracting a closing movement. This creates a "soft-close" feel. With this design, this haptic effect can advantageously be provided without the installation of costly and structurally complex dampers.

In a further advantageous embodiment of the invention, the body of the vending machine comprises a self-supporting frame structure, in particular made of metal, which can be planked with various planking materials (glass, metal, wood, plastic, etc.). In addition, user-specific information fields, e.g. with advertising messages, can be displayed both on the body and/or on the door element.

In a further advantageous embodiment of the invention, the door element has a sandwich construction. The sandwich construction comprises a plurality of layers and in particular an outer glass layer (the glass panel itself), a metal layer, an electronic layer for supporting electronic components, and an inner cover layer, in particular made of metal, which serves to cover the electronic components. The sandwich construction increases tamper resistance.

In a second aspect, the invention relates to a door element for a vending machine. The door element is tamper-resistant and has a continuous, predominantly flush front panel with integrated operating means, with the front panel preferably being designed as a touch-sensitive display.

According to a further aspect of the invention, the above object is attained by a method for controlling and operating a vending machine, in particular a card vending machine, which may be designed, inter alia, to dispense tickets or cards. The method comprises the following method steps:

Detecting an input signal from the user on an operating module of the vending machine, e.g. on a touch-sensitive screen surface of the vending machine (e.g. for selecting a payment modality or for entering authorization data). The input signal may be detected as a gesture or as a touch signal on a touchscreen display. On other operating modules, the detection of the input signal may also involve detecting the insertion of coins or the insertion of a cash card or some other input.

Generating instructions for controlling the vending machine into a changed operating state in response to the detected input signal Executing the generated instructions. The instructions may be operating instructions directed to the user (e.g., an instruction to insert a card or cash, issued on a screen element), or the instructions may be commands that must be executed directly by the vending machine (such as printing an in-stock card, issuing signals on a user interface, or triggering a counting process for coins, etc.).

Checking to determine whether the instructions have been carried out correctly and completely. This may involve automatic verification, for example, that the input of money, a card, user input and/or authorization data has been executed in the correct form and completely. If so, the following step is initiated:

Dispensing a card (e.g., as a printed paper voucher or a plastic card, as a receipt or as a chip card). Optionally or cumulatively, it is also possible for information to be output, in particular as a data set, which can be displayed, e.g., on the display.

The dispensed card may be dispensed with or without a value unit. The value unit may be printed onto the card in the form of a digital code (e.g., RFID transponder code) or a barcode, etc. The value unit can be evaluated by a downstream system (purchasing system, access control system, ticket system, parking system, etc.) as authorization.

Located inside the vending machine is a magazine which holds a number of cards. Each of these cards held in reserve in the vending machine bears a unique digital, electronic, and/or analog identifier (e.g., in the form of a barcode). The identifier is assigned to the card. This unique identifier (UID) is also stored in the server. When a card is dispensed by the vending machine, a dispensing data set is automatically transmitted by the vending machine to the server, signaling that the card having said unique identifier has been dispensed. After the card has been dispensed by the vending machine and after the unique identifier assigned to the dispensed card has been transmitted to a central server, the unique identifier, optionally along with additional data, can be forwarded to downstream systems (such as an access authorization system, a payment system, etc.). In this embodiment of the invention, no session data (i.e., data related to the current operation of the vending machine by way of user input; session data may involve input from the user or personal data of the user, such as name, amount of money, etc.) is written onto the card.

Optionally, additional data sets may also be transmitted in the dispensing data set. In the preferred embodiment of the invention, the dispensed card is not written on by the vending machine. This enables security to be significantly increased because even if the card is lost, no personal data of the user and no session data are stored on the card. Thus, no data associated with previous inputs, input signals, or personal data of the user are stored on the card.

According to a preferred embodiment of the method, before detection of the input signal in terms of time, a presence signal can be detected by means of a detector in order to activate the method, and then processed. This has the technical advantage that unintended operations of the vending machine can be prevented, for example, if a person swipes a control panel in passing but does not intend to activate it. In that case the detector, e.g. in the form of an infrared detector, can detect the duration of the presence of the supposed user and if the presence is too brief, can leave the modules of the vending machine inactivated and unlit. The signals detected by the detector are processed only internally by the vending machine and are not transmitted to the server or the database. This is an advantage in terms of the security of the data sets to be processed and transmitted, since no personal data sets (in this case, user image data) are transmitted.

According to a further refinement of the method, authorization data identifying the user may be captured prior to detection of the input signal. The captured authorization data may be sent anonymously to a server connected for data exchange and stored there, in which case deanonymization is possible only on the server in interaction with a server-based security measure. This ensures that a deanonymization of the recorded authorization data is not possible on the dispensed card or on the vending machine, since the security measure required for deanonymization (e.g., a cryptologic key) is available only on the server. The security of the method can advantageously be increased as a result.

The vending machine can be operated in three operating modes. These are, specifically:

an operating mode in which the vending machine is operated to dispense the card and is in a closed state, a cashier mode, in which value units located inside the vending machine are removed, a service mode for servicing or maintaining the vending machine and its modules, wherein the service mode and the cashier mode are initiated automatically when a service identifier or a cashier identifier has been read in by the vending machine and an electronic locking system has unlocked and opened the door element, in which case a service menu or a cashier menu is automatically output on the touch-sensitive display unit. In that case, the service technician or the cashier technician will have a corresponding specific identifier (e.g., in the form of an electronic key, optionally on an additional card or on another, optionally additional mobile data carrier), which is read in via the user interface of the vending machine. When this identifier is read in, the cashier mode or service mode of the machine is automatically initiated, which usually requires further input.

According to a preferred embodiment of the method, operator errors are detected automatically and are processed in an error handling routine. Corrective actions may be output automatically on the touch-sensitive display unit.

According to a further aspect of the invention, the above-stated object is attained by a vending machine system comprising at least one vending machine as described above, in particular a card vending machine, and a central server, wherein said vending machine and the central server are linked for data exchange via a network protocol (e.g., http/s), and wherein the vending machine, upon detection of an input signal on the vending machine, forwards a unique identifier of the card to the central server. For protection against tampering, it is ensured that the identifier is linked to one of the input signals, to session data, and/or to additional data identifying the user and stored only on the server, thereby making the system secure against tampering. If necessary, the identifier can be forwarded to the central server after the card has been dispensed.

Further details of the invention and in particular exemplary embodiments of the vending machine or vending machine system according to the invention will be explained in the following, with reference to the accompanying drawings.

DETAILED DESCRIPTION

Figure 1:
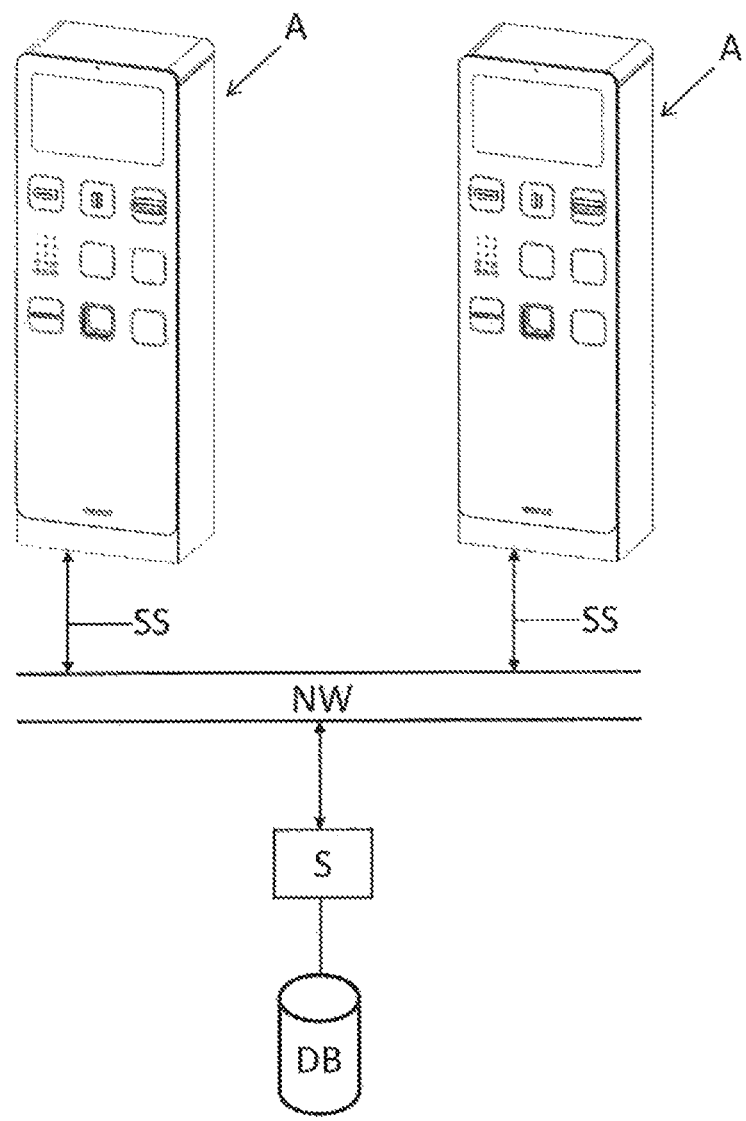
FIG. 1 is a schematic diagram of a vending machine system with a server, according to the invention.

FIG. 1 is a schematic diagram of a vending machine system comprising one or more vending machines A, which may be intended for the dispensing of cards. The vending machine system comprises two vending machines A, which comprise as a front panel V a continuous user interface formed as a glass panel. The vending machines A are connected to a central server S via a server interface SS, which may be in the form of a network NW. A database can be connected to the server S. The network may be an IP-based protocol, e.g., http/s. Alternatively, WLAN or LAN network protocols may be used. A WLAN transmission protocol can be based, e.g. on the IEEE 802.11 standard. The server interface SS is preferably bidirectional and serves for the transmission of digital data from and to the vending machine A.

The vending machine A may be designed to print cards to be dispensed. For this purpose, a transponder system with an RFID card can be used. An RFID card is a contactless chip card with wireless data and energy transmission. The RFID card typically consists of two physical carrier layers (e.g., thin plastic films) in which an RFID tag, i.e., a chip that contains the processor, the memory, and the transponder, is embedded, along with the transmitting and receiving antennae. For improved security, in a preferred embodiment of the invention further functionalities, such as error correction, password protection, encryption, and write protection, may be integrated into the electronic circuit of the card. Additionally, rights may be assigned, so that the card can only be read out (or written and read out), for example, depending upon the application. The tag integrated into the transponder card may be designed as an active tag, as a semi-passive tag, or as a passive tag. The active tags have a transmitter and may have a rechargeable battery; the passive tags draw the necessary energy from the carrier signal of the RFID reader. The RFID transmission is focused on the near range and can bridge distances of a few centimeters to several meters, depending on the RFID frequency, with the active RFID cards having a much wider range than the passive cards. The cards operate wear-free, are impervious to dirt and moisture, and can be checked merely by being held close to an RFID reader; they do not need to be taken out of the pocket for access control. The RFID reader may be a component of the vending machine system or of a downstream application system.

Figure 2A:
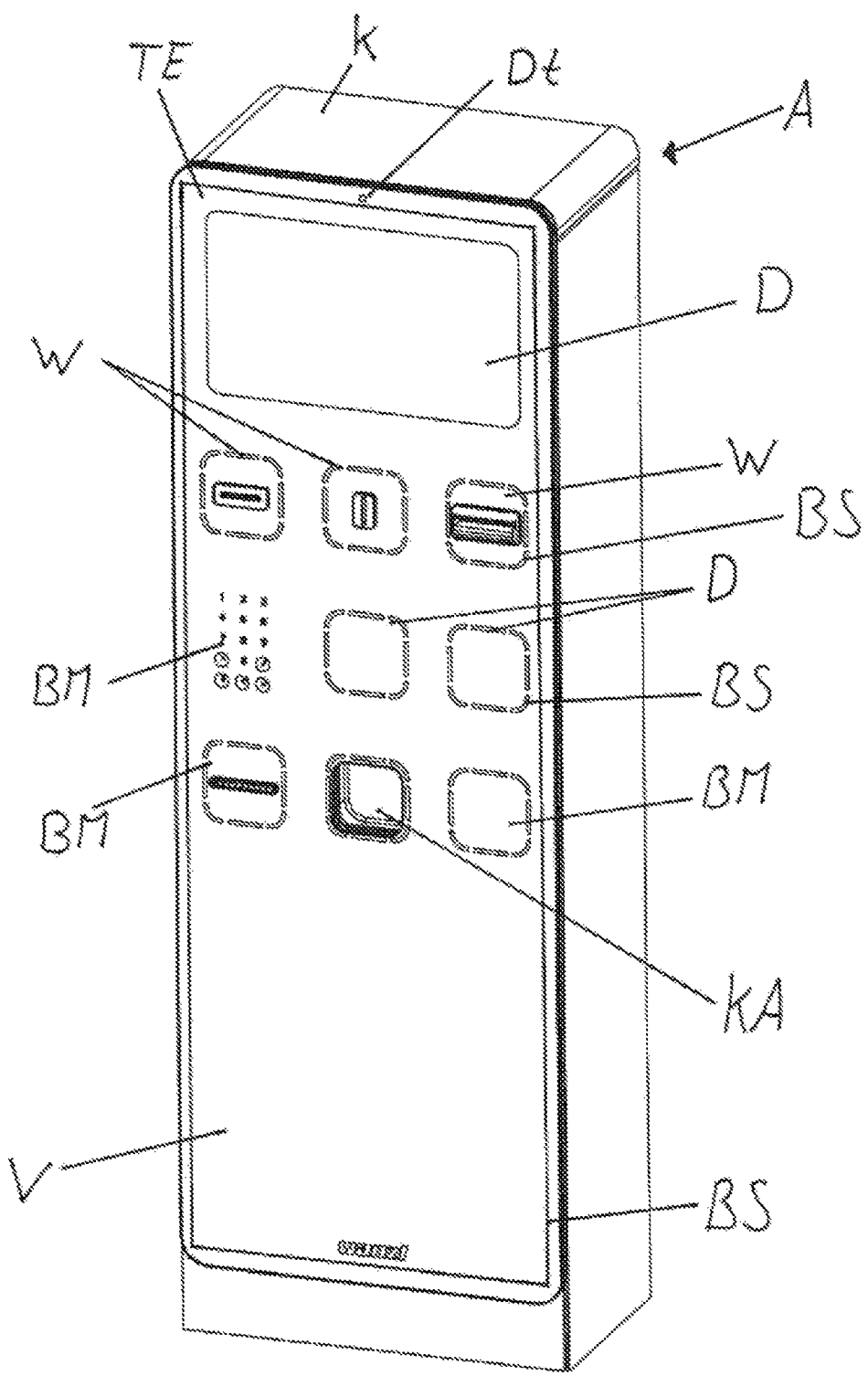
FIG. 2A is a perspective view of a vending machine with its operating modules based on one exemplary embodiment.
Figure 2B:
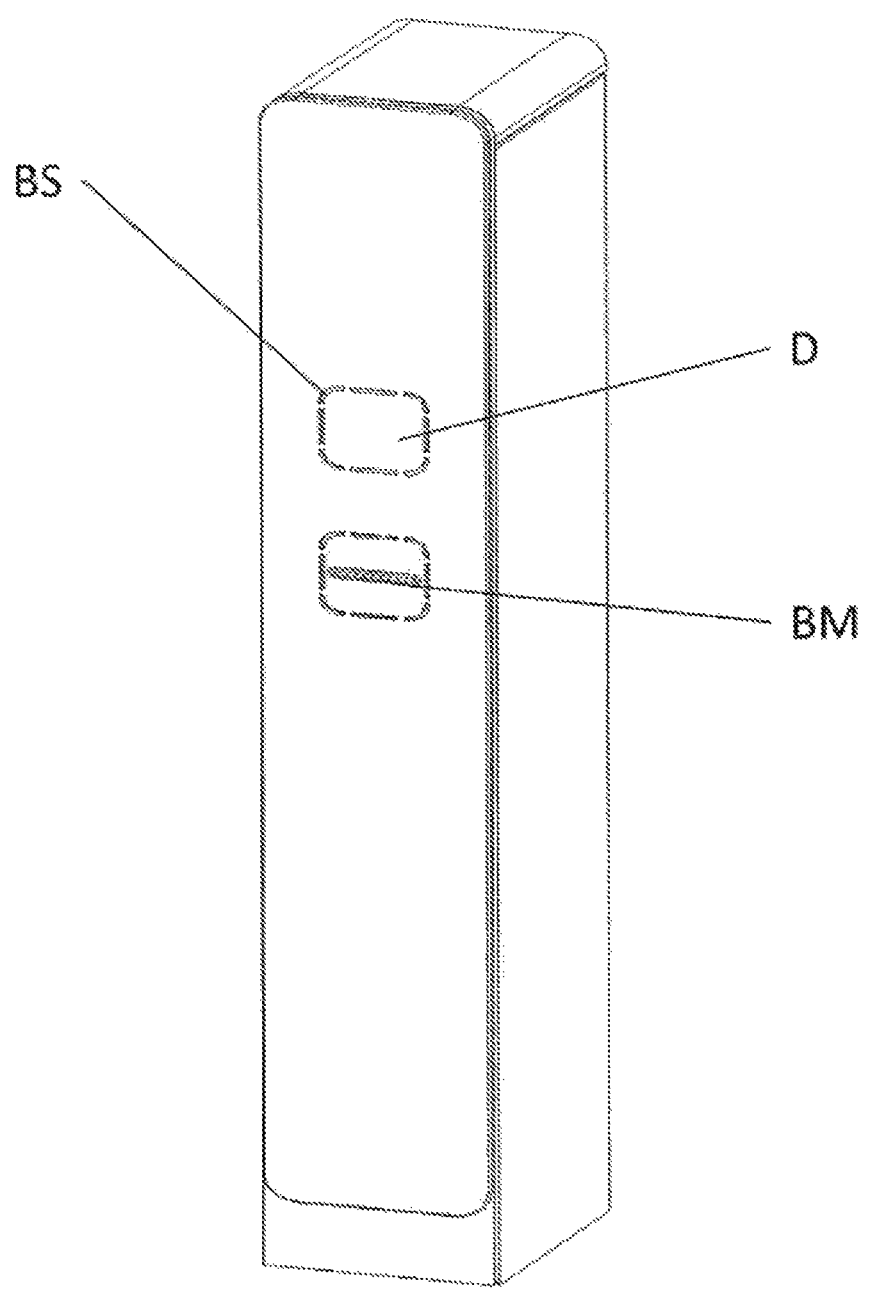
FIG. 2B.
Figure 2C:
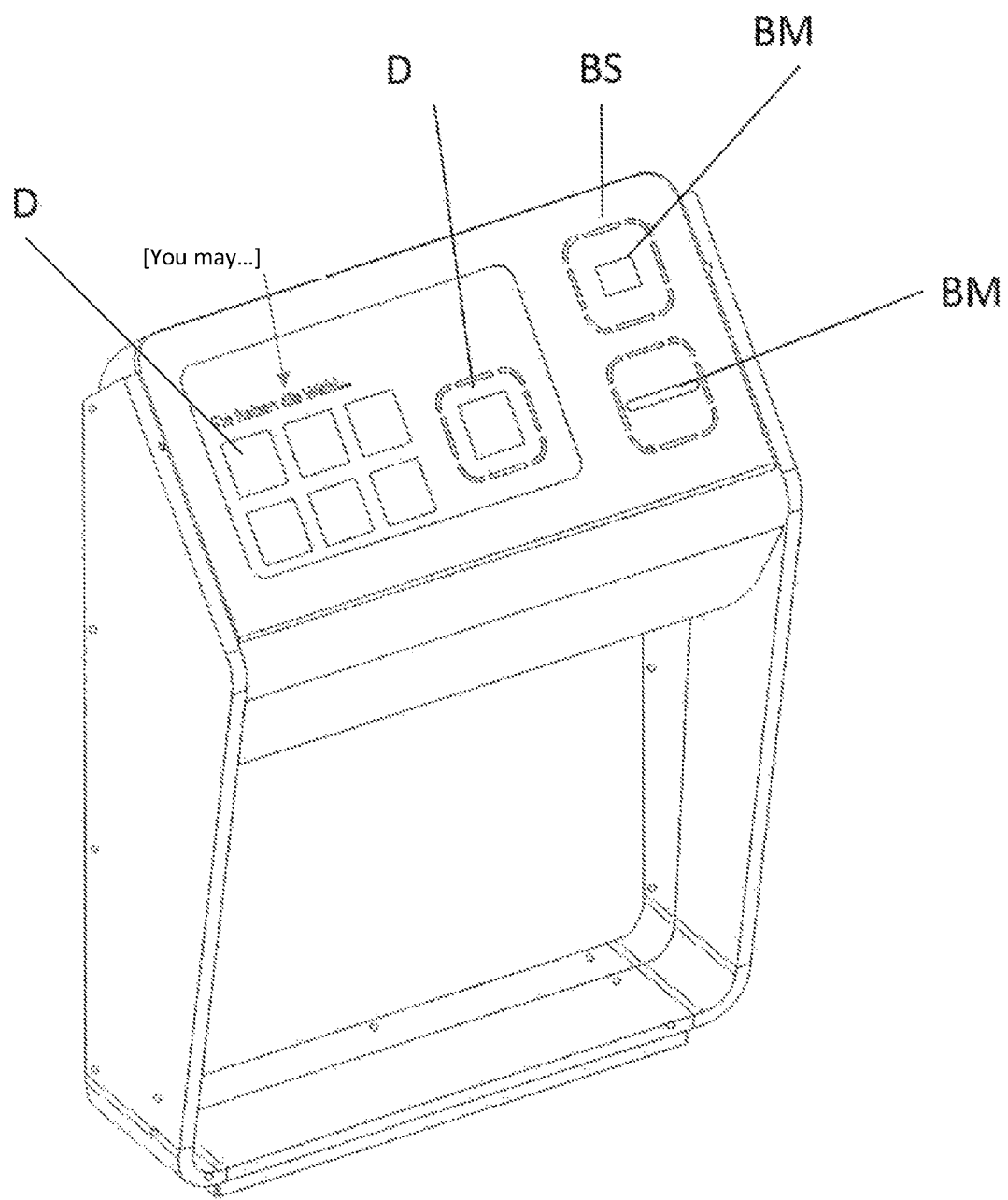
FIG. 2C show the vending machine of FIG. 2 in another embodiment of the invention, with different dimensions and configurations.

FIG. 2A shows a perspective view of the vending machine A, with additional details. The vending machine A comprises a front panel V, designed as a continuous glass panel, and a body K. In the front panel V, a plurality of operating modules BM are integrated. In the operating mode of the vending machine (i.e., during normal operation), the front panel V seals off the body K completely and securely. The operating modules BM are used to operate and control the vending machine A. All of the operating modules BM are integrated into the glass panel such that the front panel forms a flush surface. The operating modules BM comprise various modules:

multiple screen elements D intended for the input and output of data multiple insertion and dispensing units for value units W, intended for the insertion and dispensing of value units, such as cards or cash. At least one of the insertion and dispensing units for value units W is designed as a card dispensing unit and serves to dispense a card. In the exemplary embodiment shown in FIG. 2A, these are located in the top row of operating means. The center operating means in the bottom row in FIG. 2A is a coin dispenser MA. In a preferred embodiment of the invention, the dispensed card is printed with information or data (e.g., by an integrated RFID printer) in response to data entered by the user. A coin dispensing unit may also be provided.

A keypad with mechanical keys for entering data, e.g., for entering PIN data. Alternatively or cumulatively, in place of mechanical keys the keypad may be in the form of a virtual keyboard, which is displayed in a display or on a screen element D.

In addition to the operating modules BM, the front panel V may comprise a detector Dt. The detector Dt may be designed as a camera in the upper region of the vending machine for detecting, e.g., the presence of a user in an operating position. The detector Dt may also be designed as a radar or ultrasonic sensor. The front panel V may further comprise a logo element in the lower region. This serves to display additional information on the front panel V of the vending machine. The logo element can be designed and configured (e.g., with respect to lighting) according to customer requirements.

As is clear from FIG. 2A, the operating modules BM can be arranged in a tile-like structure in order to achieve better clarity and enable faster operation by arranging those operating modules BM that are to be actuated in succession ergonomically adjacent to one another. The selection and arrangement of the operating modules BM is customizable and differs from vending machine to vending machine. Rather than the three-row arrangement shown by way of example in FIG. 2A, a two-row arrangement or some other arrangement may also be provided.

Figure 3:
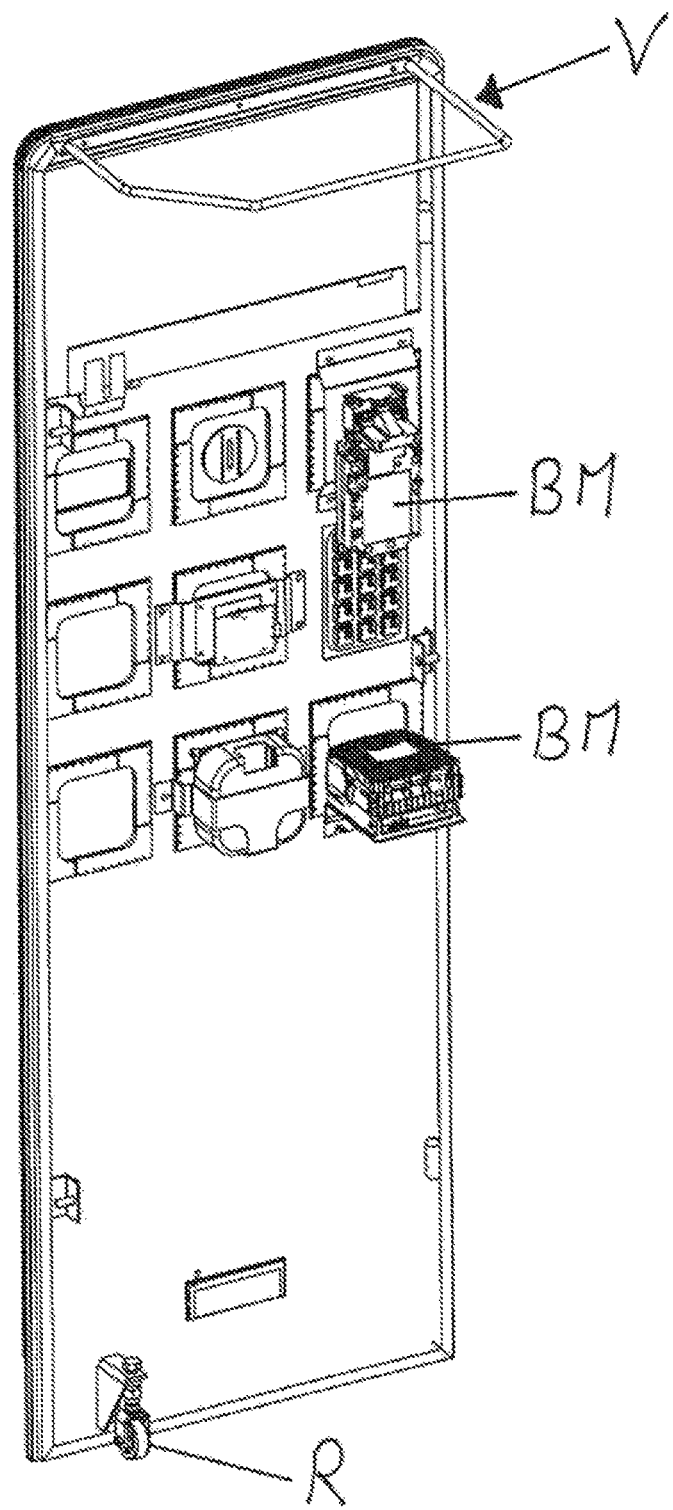
FIG. 3 is a perspective view of the door element of the vending machine as seen from the inside.

FIG. 3 shows a perspective view of the door element TE, as seen from the interior. The inside or rear view of the door element TE shows the integrated operating modules BM. In this case, a banknote reader and counter, a coin counter, and a card insertion module, along with a card dispensing unit KA are mentioned by way of example. Depending upon the application, additional or different operating modules BM may be integrated here. In the lower region on the left side, a rolling element R is shown, which is used for easy movement of the door element TE during opening and closing of the vending machine A. In the upper region, a protruding frame structure, preferably made of metal, is provided, which serves to engage with the body K when the vending machine A is closed.

Figure 4:
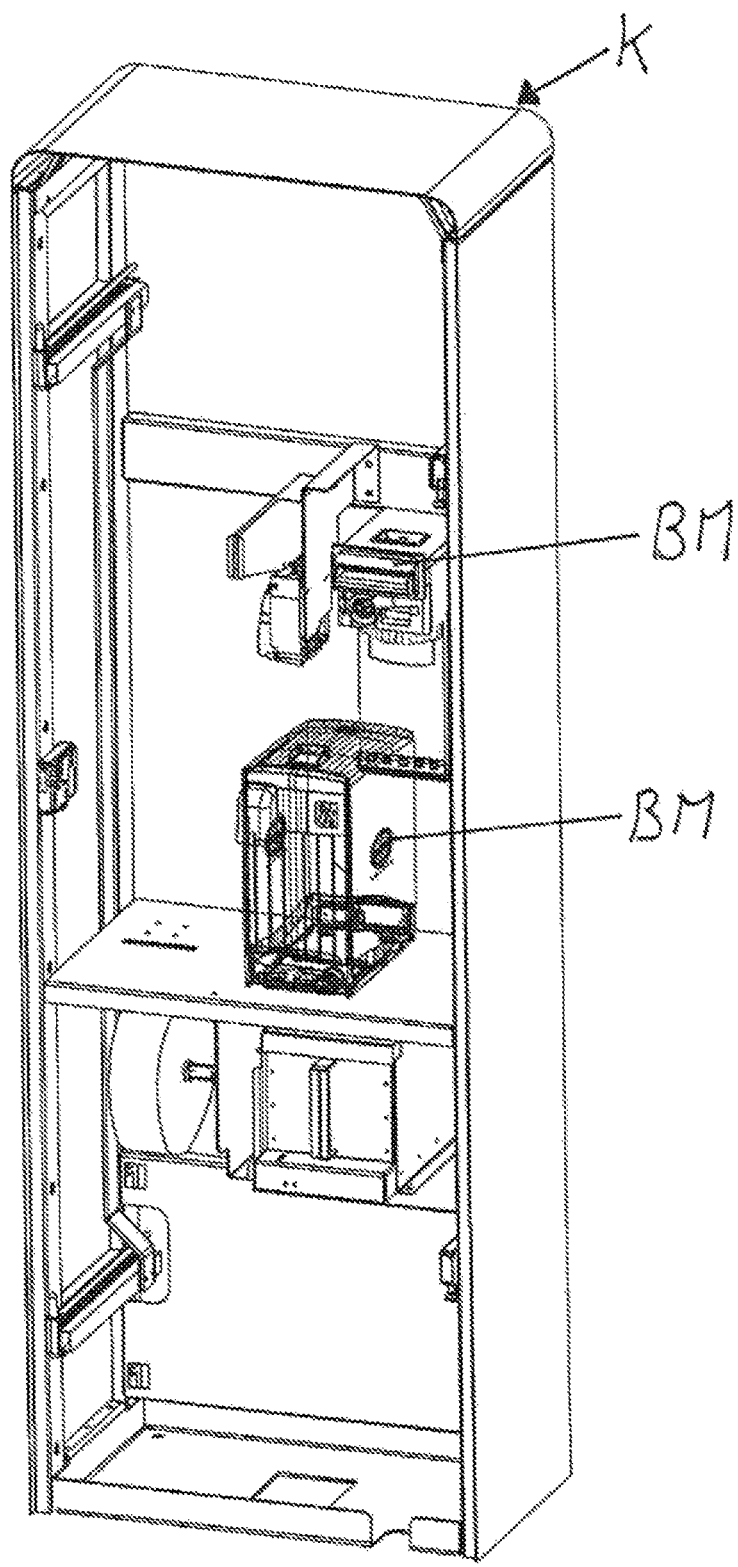
FIG. 4 is a perspective view of a body of the vending machine.

FIG. 4 shows the body K in the opened state, without door element TE. In the upper right region, an operating module BM for the insertion of coins is provided. The other operating means BM can be designed for printing and for dispensing cards from a magazine. Depending upon the configuration, additional operating modules BM may also be integrated.

Figure 5:
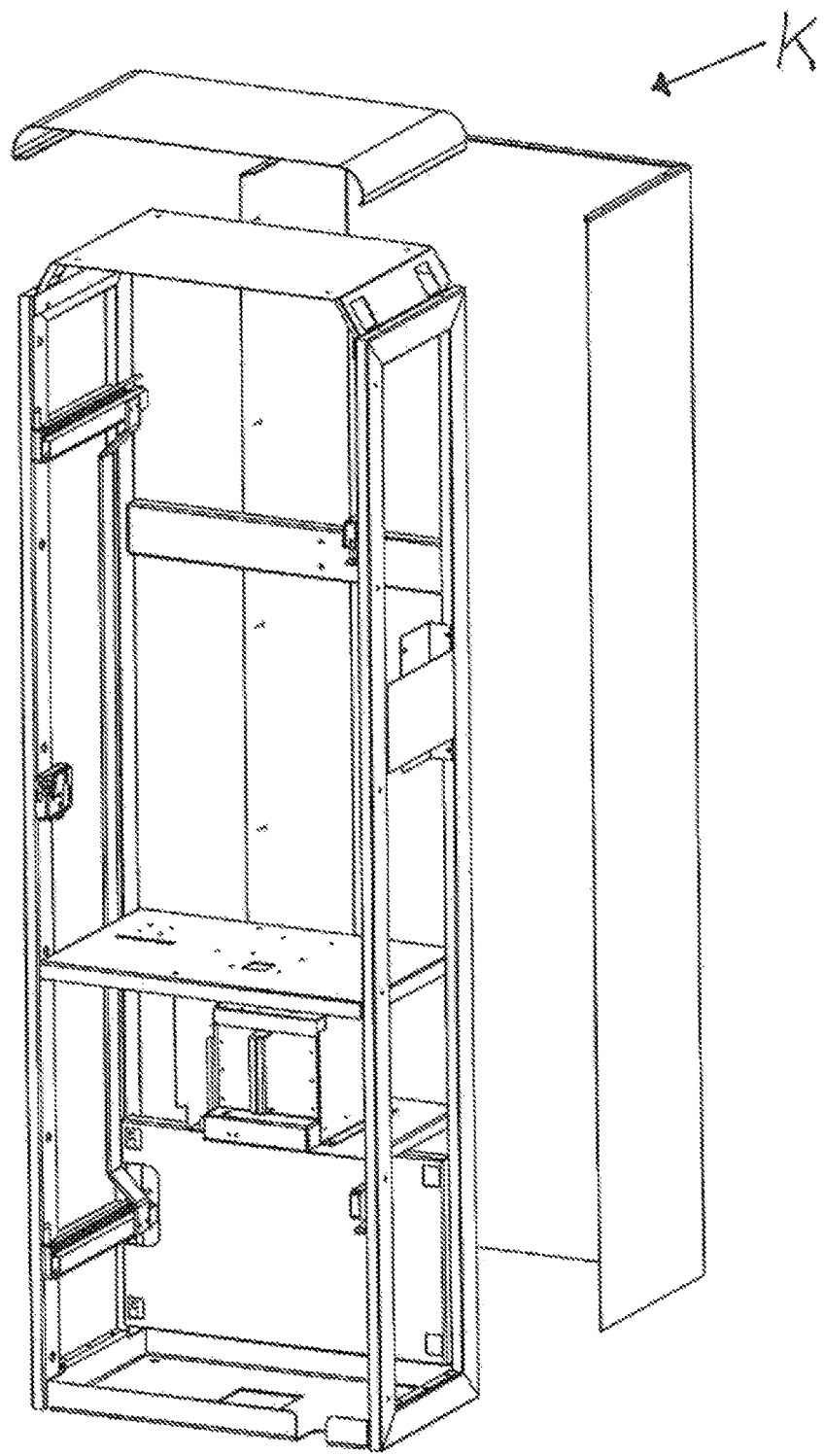
FIG. 5 is another illustration of the body, in this case prepared for the mounting of side panels.

FIG. 5 shows a perspective view of the body K with a rack-like frame structure made of metal. The frame structure is self-supporting and can be planked with various materials, as indicated in FIG. 5. Thus, further flexibility and cost savings can be achieved.

Figure 6:
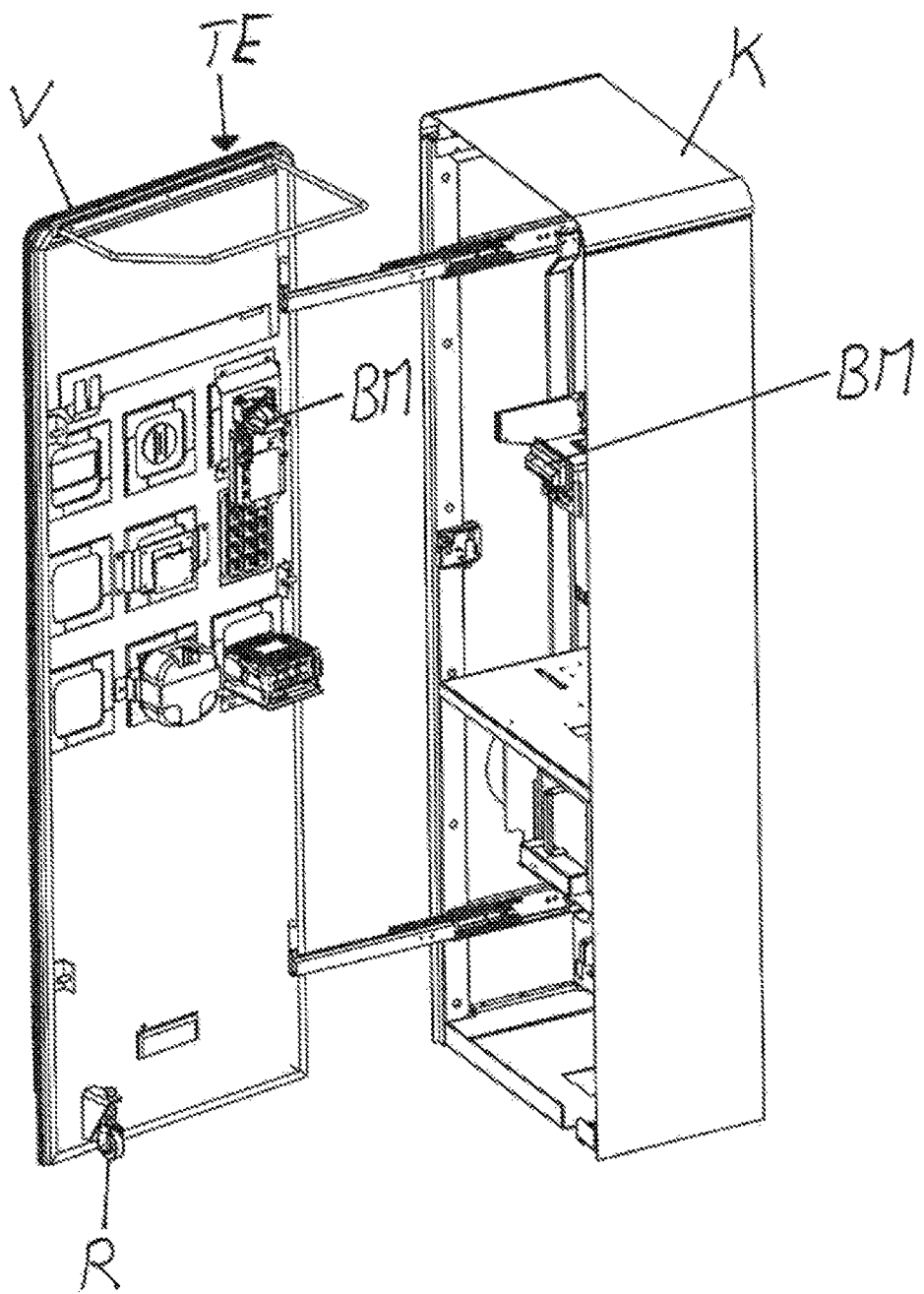
FIG. 6 shows the door element and its connection to the body in the open state.

FIG. 6 shows the door element TE in engagement with the body K in the opened state. The opened state of the vending machine A is required when the cash register needs to be emptied (cashier mode) or when the vending machine needs to be maintained (service mode). This is necessary, for example, when the magazine no longer contains enough cards or when individual operating modules BM require maintenance. In the operating mode during (normal) operation of the vending machine A, the vending machine is closed.

Figure 7:
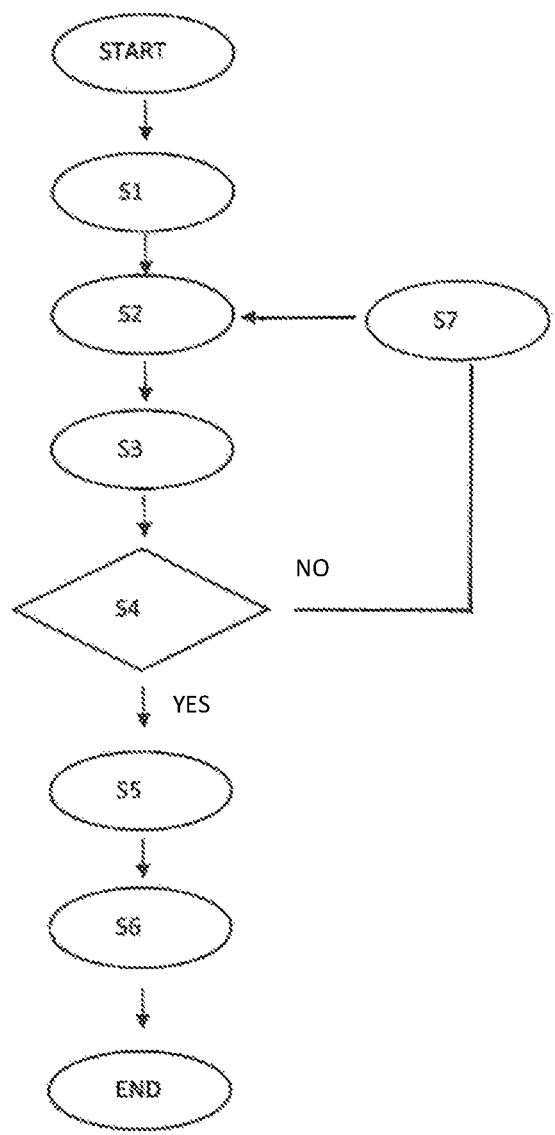
FIG. 7 is a flow chart according to one exemplary embodiment of a method for operating a vending machine.

FIG. 7 is a flow chart for one exemplary embodiment of the method for operating the vending machine A. Once the method has been started, in step S01 the presence of a user in the correct operating position can be detected. This has the advantage that the operating modules BM are activated or enabled only when a user is present. Otherwise, the operating modules BM can be in an energy-saving standby mode. In step S1, an input signal is detected on an operating module BM. The input signal can be detected on a screen element D, for example by the user indicating which payment modality he desires or wishes to use. The input signal can also be detected directly on the card reader by the insertion of a card being detected as an input signal. The insertion of a coin may also serve as an input signal. In step S2, an instruction or sequence of instructions is generated, which is used to control the vending machine A in response to the detected input signal. The instructions may be directed to the user for further operation of the vending machine, or may be designed directly for the vending machine A. For instance, the instruction may indicate that a specific illuminated segment BS is to be activated in response to the detected input signal and that the illumination signals that an operation of the respective operating module BM is required in the next operating step. This has the technical advantage that the user is practically guided through an operating sequence and the associated inputs by the specifically controlled illumination of individual tiles or operating modules BM. The user is guided from input to input. The instruction may also instruct the vending machine to emit an error signal in the event of erroneous input.

In step S4, a check is made to determine whether the instruction has been carried out correctly and completely (by the user or by the vending machine A). Only if the answer is yes is the card dispensed in step S5. Otherwise, a modified instruction can be generated in step S7, which is then processed further as described above. In step S6, the unique identifier UID of the dispensed card can be transmitted to the server S. The unique identifier UID can be processed by additional security measures on the server (and only there) to calculate additional data sets, such as statistical analyses of the number of cards dispensed within a given period of time and the need to refill cards in the vending machine, or tracking of which actions have been performed on the vending machine in order to enable the situation to be reconstructed in the case of misuse. This also increases the security of the vending machine.

Figure 8:
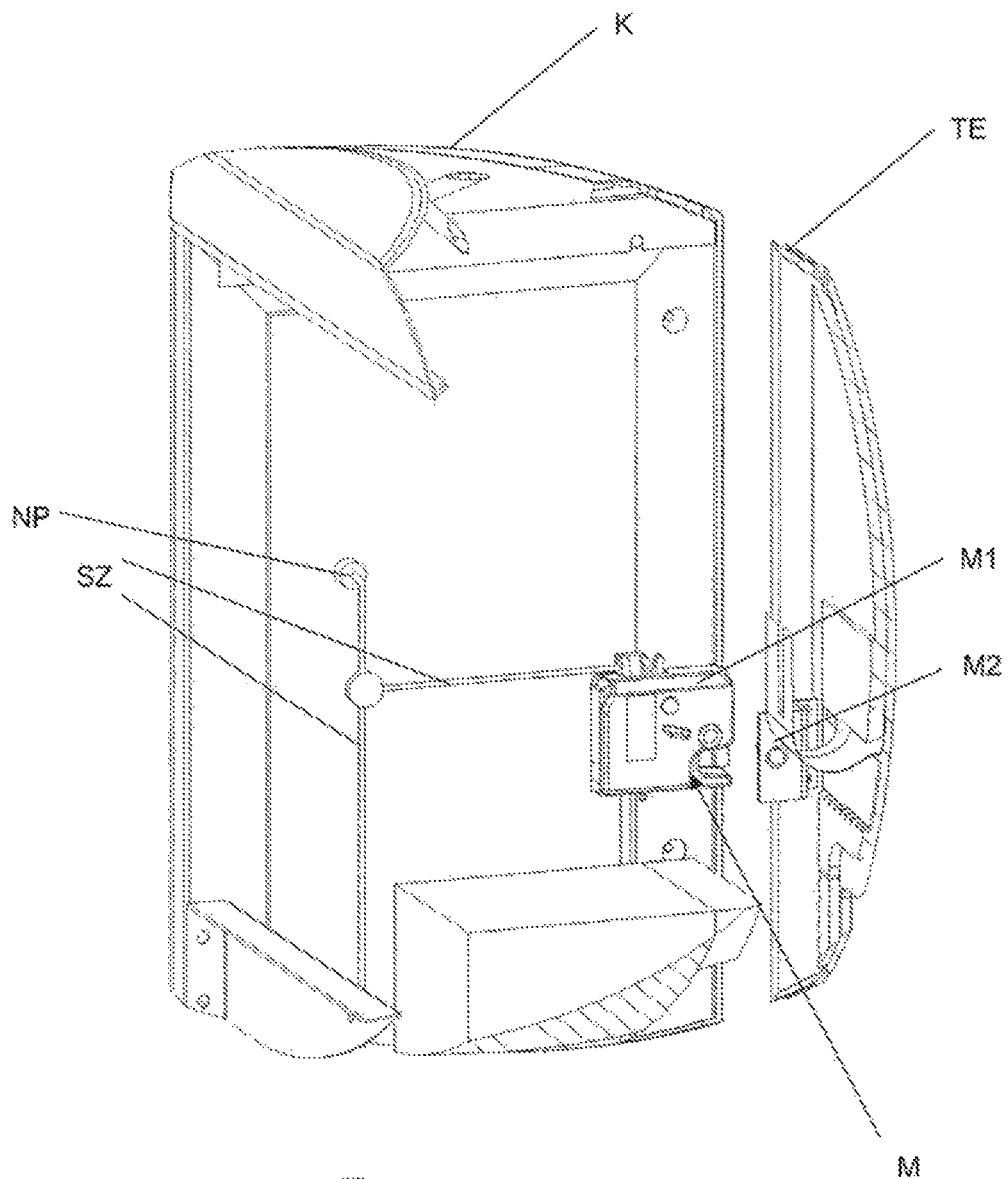
FIG. 8 is a view of a locking and unlocking mechanism for opening and closing the vending machine.

FIG. 8 shows a perspective view of a wall element of the vending machine A from the inside of the assembled vending machine. Here, the mechanical locking and unlocking mechanism M, which is used for the secure opening and closing of the vending machine A, is shown in greater detail. The lock system comprises an emergency release system in the event of a loss of power in the vending machine A. As is clear from FIG. 8, the mechanical locking and unlocking mechanism M in the example shown there comprises an electronically actuable lock M1 which is installed in the body K (cabinet housing) and which engages with an associated locking pin M2. The locking pin M2 is fixedly connected or attached to the door element TE, or integrated therein.

When the door is opened electronically, lock M1 unlocks and releases the pin M2. The door element can then be pulled open.

If the supply of power to the locks should fail, for example, it is possible for a hole to be drilled in the cabinet housing at a predefined emergency position NP, thereby enabling access to the emergency release. By means of a rotary movement at emergency position NP, control wires SZ are tightened. The pulling movement of the control wires SZ effects a mechanical opening of all the locks.

All features detailed and shown in connection with individual embodiments of the invention may be provided in different combinations in the article according to the invention, in order to realize their advantageous effects simultaneously.

All method steps of the method may be implemented by means of electronic devices (circuits) suitable for carrying out the respective method step. Conversely, all functions performed by objective features may constitute a method step of a method. For instance, the method step "generating instructions" may be implemented by an instruction module that has the said corresponding functionality.

The scope of the present invention is given by the claims and is not limited by the features detailed in the description or shown in the figures.

The invention claimed is:

1. A tamper-resistant vending machine comprising:
a door element and a body, wherein a plurality of integrated operating modules is formed in the door element, and wherein the operating modules comprise multiple screen elements for input and output of data, and multiple insertion and dispensing units for insertion and/or dispensing of value units, wherein an entire front panel of the door element is formed as a tamper-resistant, wear-resistant, continuous glass panel, into which the operating modules are integrated flush with a continuous front panel surface, the continuous glass panel comprising a glass sheet with cutouts into which the operating modules are inserted so as to form the continuous front panel surface, the continuous front panel surface forming a plane free from protrusions extending therefrom, and wherein the screen elements are formed as a touch-sensitive screen.

2. The tamper-resistant vending machine according to claim 1, wherein the positioning of the operating modules is flexible during manufacture, and in the assembled state the operating modules are not exchangeable without tools and are integrated to form a continuous, tamper-resistant monolithic unit; wherein the vending machine is a ticket vending machine; and wherein the dispensing unit is a card dispensing unit.

3. The tamper-resistant vending machine according to claim 2, wherein one operating module of the tamper-resistant vending machine is embodied as a printer for printing the card to be dispensed.

4. The tamper-resistant vending machine according to claim 1, wherein the vending machine comprises a lighting unit having a plurality of lighting segments, wherein one of the lighting segments is arranged on the front panel of the door element and extends along an outer edge of the door element; and wherein the lighting unit is configured to activate only in a presence of a user in an operating position.

5. The tamper-resistant vending machine according to claim 1, wherein the tamper-resistant vending machine comprises a server interface to an external server, and wherein a database is connectable to the server.

6. The tamper-resistant vending machine according to claim 1, wherein the door element has approximately the same structural height as the body of the tamper-resistant vending machine.

7. The tamper-resistant vending machine according to claim 1, wherein the glass panel is single-pane safety glass and is treated with stealth effect printing.

8. The tamper-resistant vending machine according to claim 1, wherein the tamper-resistant vending machine comprises an electronic locking system, operated with an electronic key, for opening and closing the body; and wherein the door element is mounted pivotably on the body and is pivotable to an angle up to approximately 90° in an open state if the electronic locking system has been opened.

9. The tamper-resistant vending machine according to claim 1, wherein an electronic locking system of the tamper-resistant vending machine operates a mechanical locking and unlocking mechanism, wherein the locking mechanism is not visible from outside of the vending machine and is located completely behind the door element.

10. The tamper-resistant vending machine according to claim 9, wherein in addition to being activated by the electronic locking system, the locking and unlocking mechanism is activatable by a mechanical emergency activation system, wherein the mechanical emergency activation system is accessible inside the tamper-resistant vending machine.

11. The tamper-resistant vending machine according to claim 1, wherein a spring element is arranged in the body of the tamper-resistant vending machine and exerts a force counteracting a closing movement as the door element is pivoted from an open to a closed state; and wherein the door element has a sandwich construction and sequentially comprises an outer glass layer, a metal layer, an electronic layer for supporting electronic components, and an inner covering layer.

12. The tamper-resistant vending machine according to claim 1, wherein the body of the tamper-resistant vending machine comprises a self-supporting frame structure which is planked with various planking materials.

13. A door element for use for the tamper-resistant vending machine according to claim 1, having a front panel formed entirely as a tamper-resistant continuous glass panel into which the operating modules are integrated flush with a continuous front panel surface, the tamper-resistant continuous glass panel comprising a glass sheet with cutouts into which the operating modules are inserted so as to form the continuous front panel surface, the continuous front panel surface forming a plane free from protrusions extending therefrom, wherein the screen elements are formed as a touch-sensitive screen; and wherein each of the operating modules is a same size.

14. A vending machine system having at least one tamper-resistant vending machine, and having a central server, wherein the at least one tamper-resistant vending machine and the central server are connected for data exchange via a network protocol, and wherein following detection of an input signal on the tamper-resistant vending machine, the tamper-resistant vending machine forwards a unique identifier of a card to the central server, and wherein the identifier is linked to an input signal and/or identification data of a user and stored exclusively on the server; wherein the tamper-resistant vending machine comprises: a door element and a body, wherein a plurality of integrated operating modules is formed in the door element, and wherein the operating modules comprise multiple screen elements for input and output of data, and multiple insertion and dispensing units for insertion and/or dispensing of value units, wherein an entire front panel of the door element is formed as a continuous, wear-resistant glass panel, into which the operating modules are integrated flush with a continuous front panel surface, the continuous, wear-resistant glass panel comprising a glass sheet with cutouts into which the operating modules are inserted so as to form the continuous front panel surface, the continuous front panel surface forming a plane free from protrusions extending therefrom, and wherein the screen elements are formed as a touch-sensitive screen.

15. A method for controlling a tamper-resistant vending machine, wherein the vending machine comprises a door element and a body, wherein a plurality of integrated operating modules is formed in the door element, and wherein the operating modules comprise multiple screen elements for input and output of data, and multiple insertion and dispensing units for insertion and/or dispensing of value units, wherein an entire front panel of the door element is formed as a tamper-resistant continuous glass panel, into which the operating modules are integrated flush with a continuous front panel surface, the continuous glass panel comprising a glass sheet with cutouts into which the operating modules are inserted so as to form the continuous front panel surface, the continuous front panel surface forming a plane free from protrusions extending therefrom, and wherein the screen elements are formed as a touch-sensitive screen, wherein cards are held in reserve in a magazine in the vending machine, wherein each of the reserved cards has a unique identifier, the method comprising the following method steps:

detecting an input signal on an operating module of the vending machine generating instructions for controlling the vending machine in response to the detected input signal carrying out the generated instructions checking to determine whether the instructions have been carried out correctly and completely, and if so:

dispensing a card or a data set.

16. The method according to claim 15, wherein no digital data associated with personal data of a user are stored on the dispensed card or in the data set.

17. The method according to claim 15, wherein prior to the detection of the input signal, a presence signal of a detector is detected and processed to activate the method.

18. The method according to claim 15, wherein prior to the detection of the input signal, authorization data identifying the user are captured, and wherein the captured authorization data are stored in an anonymized manner in a server that is connected for data exchange, wherein deanonymization is possible only on the server in interaction with a server-based security measure.

19. The method according to claim 15, wherein the tamper-resistant vending machine is operable in three operating modes:

an operating mode, in which the tamper-resistant vending machine is operated to dispense the card or the data set, a cashier mode, in which value units located inside the vending machine are removed, a service mode for servicing the vending machine and its modules, wherein the service mode and the cashier mode are initiated automatically when a service identifier or a cashier identifier has been read in by the vending machine and an electronic locking system has unlocked and opened the door element, wherein a service menu or a cashier menu is automatically output on the touch-sensitive screen.

20. The method according to claim 15, wherein operator errors are detected and are processed in an error handling routine, and a corrective action is output automatically on the touch-sensitive screen; and wherein after dispensing of the card or the data set, the unique identifier associated with the card or the data set is forwarded to a central server or to downstream systems.

\* \* \* \* \*